Figure 1:
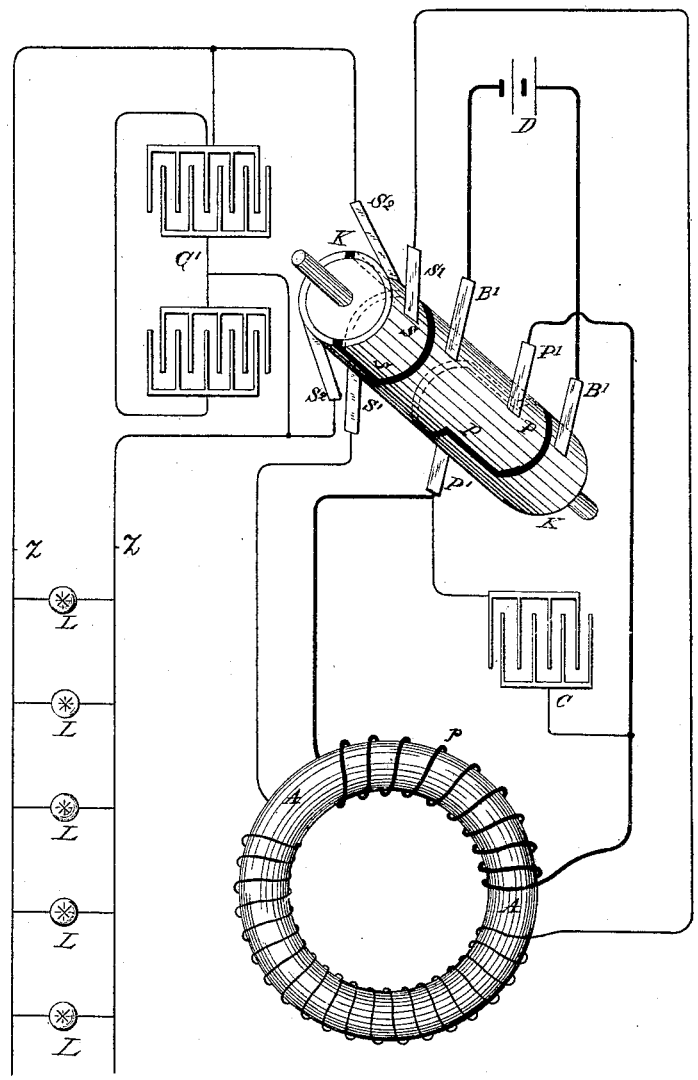

(No Model.)  3 Sheets—Sheet 1.

E. J. HOUSTON.
SYSTEM OF ELECTRIC DISTRIBUTION AND GENERATION.

No. 522,986. Patented July 17, 1894.

WITNESSES:

INVENTOR
Edwin J. Houston
BY
Townsend & MacArthur
ATTORNEYS (No Model.)
E. J. HOUSTON.
SYSTEM OF ELECTRIC DISTRIBUTION AND GENERATION.
No. 522,986. Patented July 17, 1894.
3 Sheets—Sheet 2.
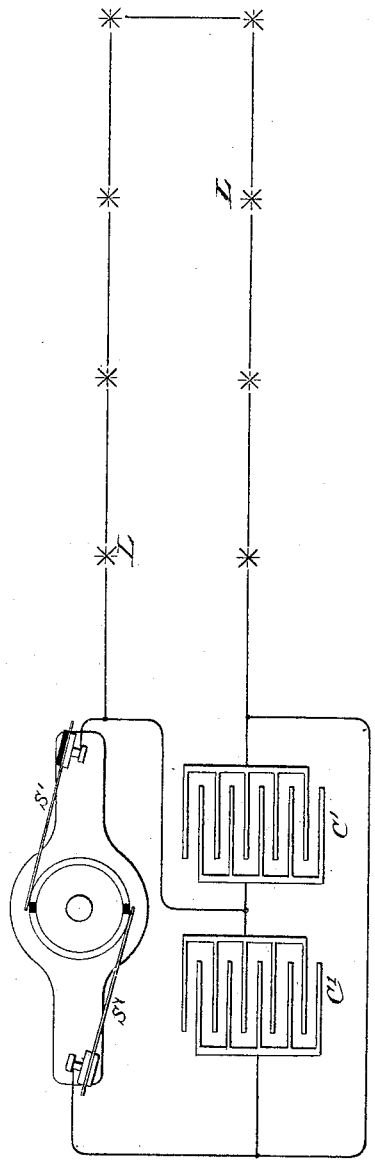
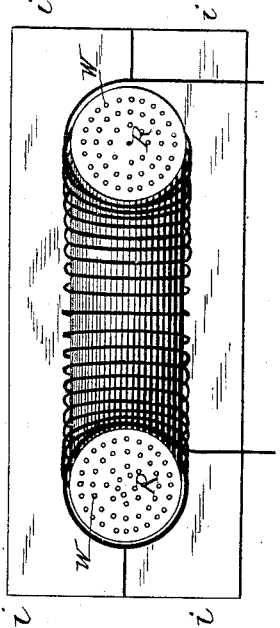
WITNESSES:
INVENTOR
Edwin J. Houston
BY
Townsend + MacArthur
ATTORNEYS

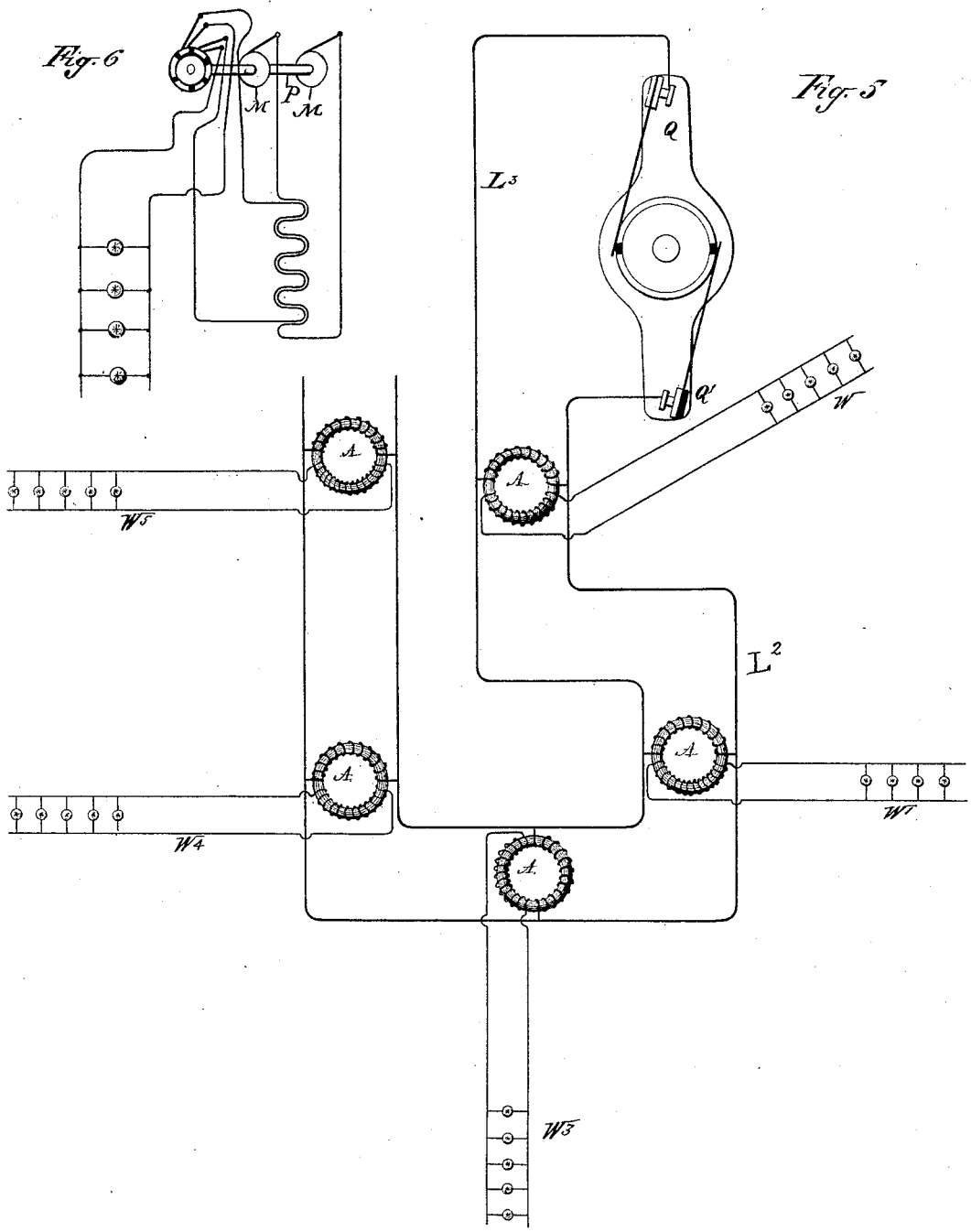

UNITED STATES PATENT OFFICE.

EDWIN J. HOUSTON, OF PHILADELPHIA, PENNSYLVANIA.

SYSTEM OF ELECTRIC DISTRIBUTION AND GENERATION.

SPECIFICATION forming part of Letters Patent No. 522,986, dated July 17, 1894.

Application filed November 17, 1887. Serial No. 255,454. (No model.)

*To all whom it may concern:*

Be it known that I, EDWIN JAMES HOUSTON, a citizen of the United States, and a resident of Philadelphia, in the county of Philadelphia and State of Pennsylvania, have invented a certain new and useful System of Electric Generation and Distribution, of which the following is a specification.

My invention relates to certain new and useful improvements in systems of electric generation and in the distribution of the currents so generated whereby electric currents or charges of a low electro-motive force are readily and economically converted into electric currents or charges of high electro motive force. As is well known to those skilled in the art a number of well known prime electric sources exist, the practical application of which is of but limited extent owing to the fact that the difference of electric potential at the terminals of the generator or in other words the actual electro motive force of the current generated is too small to be actually applied for the ordinary purposes of electric signal transmission, or for systems of electric light or power, or even in certain cases for the purpose of electro metallurgy.

The object of my invention is to provide means whereby these ends may be accomplished, that is to say to provide means whereby the currents or charges developed by a prime generator of very low electro-motive-force may be readily and economically converted into currents or charges of any desired electro-motive-force.

My invention also provides a means for the economical distribution of currents of electricity whereby currents of low electro-motive-force are first changed into currents of high electro-motive-force which can then be transmitted to a considerable distance through comparatively small conductors without much loss of energy.

In the practice of the first part of my invention I pass the current from a unipolar dynamo electric machine, thermo electric pile, combustion carbon-battery, or other source capable of generating electric currents or charges of great quantity but low electro-motive-force, through the primary of an induction coil of any of the well known forms. This current I cause to vary in intensity or direction by any of the well known methods, such as are employed in connection with induction coils, so as to develop secondary currents of higher electro-motive-force in the secondary coils of the induction apparatus. At the same time I provide the secondary coils of the induction apparatus with a suitable commutator acting in unison with the devices providing changes in the direction or intensity of the primary current so as to commute or turn into one and the same direction the high potential alternating currents developed in the induction apparatus.

I do not limit myself to any particular form of induction coil, but I prefer such forms as complete their magnetic circuit through masses of iron, and so possess a small magnetic resistance. I also prefer such forms as have as short magnetic circuits as possible.

Figure 2:
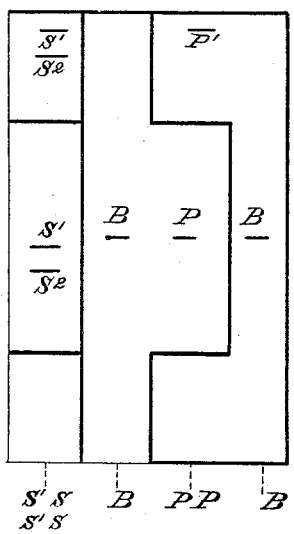

In the accompanying drawings:—Figure 1, illustrates a manner in which the principles of my invention may be carried out. Fig. 2, shows a development of the commutator surface. Figs. 3 and 4, illustrate modifications of the invention. Fig. 5, shows a method for the economical distribution of currents to great distances. Fig. 6, shows another modification of my invention.

In Fig. 1, is shown an induction coil of any suitable construction, whose core A, A, is surrounded by the primary and secondary coils of insulated wires $p$, $p$, and $s$, $s$, respectively, the secondary coil for the purpose being of course of very much greater length than the primary coil.

D, is an electric source of low electro motive force, such for instance as a thermo-pile, a unipolar dynamo electric machine, or other similar source yielding constant currents of very small electro-motive-force.

K, K, is a commutator of any construction suitable for properly varying, interrupting, changing or reversing the currents from the source D. The source of constant low potential D, is placed in a circuit whose terminals are provided with brushes or sliding contacts B', B', resting on the continuous contact surfaces B, B, of the commutator K, K.

The terminals of the primary coils of the induction apparatus are provided with contact brushes P', P', resting on the commutator at P, P, and therefore, on the rotation of the commutator shaft, coming alternately into contact with the positive and negative terminals of the low potential source D. The rotation of the commutator will therefore cause the current of D, to rapidly alternate in the primary coils $p, p$, of the induction coils A, A, thus providing alternating currents in the secondary coils, $s, s$. In order to commute these secondary currents which, as is well known, may be of high electro motive force, when the length of the secondary coil is properly proportioned to that of the primary, I provide the contact brushes S', S', which bear on the commutator segments S, S, in the manner shown in the drawings.

The commutator formed by segments S, S, and brushes bearing on the same is preferably mounted on the same shaft as the commutator in the primary circuit so as to move in unison therewith under the operation of any suitable driving power and the number of plates in the commutator for the secondary are chosen with reference to the number of changes produced by the commutator in the primary so that the changes of connection in the secondary commutator shall take place at or about the same time with the changes produced by the primary commutator. In order to provide for an adjustment of the secondary commutator so that its changes shall coincide with the developments of the secondary current its brushes may be mounted upon a suitable adjustable support.

I have shown the commutator for commuting the secondary currents as provided with two sets of brushes S', S', and $S^2$, $S^2$. In this case the brushes S', S', are provided merely for the purpose of connecting the terminals of the secondary coil with the commutator segments. The pair $S^2$, $S^2$, commute the current and carry it off to the leads Z, Z, as shown.

The brushes S', S', and $S^2$, $S^2$, either one or both pairs are supported in any suitable mechanism for adjustment, such for example as is shown in connection with Figs. 3 and 5.

The commutator brushes $S^2$, $S^2$, which rest on the commutator segments S, S, somewhat inclined, but nearly parallel to the contact brushes S', S', carry off a current of an electromotive-force much higher than that furnished by the source D. These latter brushes $S^2$, $S^2$, are connected to the circuit in which are placed the lights, motors, baths, or other electro-receptive devices which it is desired to energize.

I have shown in connection with the figures a commutator in which the constant currents of low electro-motive-force are converted into alternating currents that flow through the primary of the induction apparatus. It is evident however that by providing suitable insulating spaces on the commutator I can, where it is so desired, pass an intermittent or broken current through its primary. In this case a suitable change is made in the position and shape of the contact segments S, S, such as will suffice to cause the current collected by the commutator brushes Q, Q, to pass or flow in one and the same direction.

Since the commutator segments S, S, form the sliding terminals of the secondary coils of the induction apparatus, they may, if so desired, be connected with suitable condensers so as to increase the energy and uniformity of the current. I have shown such condensers at C', in Figs. 1 and 3. Their opposite coatings are connected with conductors from the brush terminals $S^2$, and $S^2$, and with the main leads Z, Z, in the manner shown. Besides steadying the current and increasing the economy of translation of the inductive apparatus, the condensers C', C', placed as shown in the above mentioned figures, prevent undue and injurious sparking at the commutator. I also prefer to place a condenser between the terminals of the brushes P', P', as shown at C, in Fig. 1, for similar purposes. These condensers are formed preferably of paraffined sheets of mica suitably combined with sheets of tin-foil in the usual manner.

I have shown and described the prime source at D, as producing a current of low electro-motive-force flowing always in one and the same direction and have provided a device whereby such current is caused to be rapidly reversed or broken when passed through the primary coil of the induction apparatus. When however the source of low electro-motive-force furnishes an alternating or a non-commuted current I connect it directly with the primary of the induction apparatus. Such a modification is shown in Fig. 6. Here the collecting rings of an alternating current dynamo are indicated at M, M. The secondary commutator is mounted on the armature shaft P, of the dynamo and has a number of segments corresponding to the number of alternations of current produced by the dynamo in a single revolution of its armature. The effect is obviously the same as before, the alternating secondary currents being received on the secondary commutator which rotates in unison with the primary or inducing alternations and turned thereby into currents in the same direction. The secondary commutator might be made to move in unison with the changes of primary current in any other way or by any other desired means without departing from the spirit of my invention.

I have shown the converter or transformer as consisting of a ring of iron wrapped with primary and secondary coils. Such a ring forms a very convenient form of induction apparatus for the transformation of electric potential. When such rings are employed, I prefer to form them of bundles of soft iron wire $w, w$, as shown in section at B, B, Fig. 4. In order to still further increase the efficiency of conversion, I prefer to surround said cores when wrapped with their primary and secondary coils with plates of sheet iron $i, i, i, i$, Fig. 4, insulated from each other by varnish or other suitable substance.

I have shown the electro-receptive devices designed to be operated by the commuted currents of high electro motive force as being connected with the mains or leads in multiple arc, and this method I prefer in general as best suited for regulation. It is evident, however, that in certain cases, the series arrangement of the electro-receptive-devices, as shown in Fig. 3, may be preferable, as is usually the case in most systems of arc lights.

When powerful alternating currents of low electro motive force are produced by any suitable source in order to avoid the expense of the heavy mains thereby necessitated, I arrange the same for a convenient center of distribution as shown in connection with Fig. 5, and after converting such current into others of a higher electro-motive-force, lead the same off by suitable conductors to the outlying districts of the said central station.

In Fig. 5, Q, Q', represent the terminals of alternating currents connected to the heavy leads $L^3$, $L^2$, arranged around a common center of distribution, and feeding a number of inductive coils A, A, A, &c., connected into said mains in multiple arc. The secondaries of such coils are then led off by the leads W, W', $W^2$, &c., to the districts where the electro receptive devices are located. In this way it is practicable to utilize very heavy actuating currents and economically transmit them for a considerable distance.

I do not here claim the induction apparatus as a means for producing alternating currents of high electro motive-force from constant or alternating currents of low electro-motive-force since such apparatus has been known and practiced in the art, but I do claim and desire to secure by Letters Patent the hereinbefore described means whereby such alternating currents, however produced may be commuted and caused to flow in one and the same direction. I do not limit myself to the particular form of commutator described, but claim broadly the commutation of the alternating currents of high electro-motive-force produced as described from either constant or alternating currents of low electro-motive-force.

Among the many evident advantages secured by my invention are the practicability thus secured for the first time of employing such sources as the unipolar dynamo electric machine, the thermo-pile, or the difference of potential produced by the direct combustion of coal to any of the purposes for which high potential currents are applicable.

What I claim as my invention is—

The combination with a source of currents of low electro motive force, of an induction coil having a low tension primary and high tension secondary, the commutator in the primary, the commutator in the secondary timed to change its connections in unison with the changes in the primary, the condenser across the terminals of the commutator and the condenser across the terminals of the primary, as and for the purpose described.

Signed at Philadelphia, in the county of Philadelphia and State of Pennsylvania, this 28th day of October, A. D. 1887.

EDWIN J. HOUSTON.

Witnesses:
Z. HOPPER,
GRANVILLE FAUGHT.